(12) United States Patent
Clouse et al.

(10) Patent No.: US 7,291,946 B2
(45) Date of Patent: Nov. 6, 2007

(54) DAMPER FOR STATOR ASSEMBLY

(75) Inventors: Brian E. Clouse, Saugus, MA (US);
Louis M. Cardoso, Cape Neddick, ME (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 10/248,532

(22) Filed: Jan. 27, 2003

(65) Prior Publication Data
US 2004/0145251 A1    Jul. 29, 2004

(51) Int. Cl.
*H02K 5/24* (2006.01)
*F01D 5/00* (2006.01)

(52) U.S. Cl. ............... 310/51; 415/191; 415/119
(58) Field of Classification Search ........... 415/119, 415/209, 191; 310/51
See application file for complete search history.

(56) References Cited

U.S. PATENT DOCUMENTS

| | | | | |
|---|---|---|---|---|
| 2,991,045 A * | 7/1961 | Tassoni | ............ | 415/135 |
| 3,326,523 A * | 6/1967 | Bobo | ............ | 415/209.3 |
| 3,601,414 A * | 8/1971 | Rao | ............ | 415/174.2 |
| 3,730,640 A * | 5/1973 | Rice et al. | ............ | 415/117 |
| 3,887,299 A * | 6/1975 | Profant | ............ | 415/173.4 |
| 4,053,254 A * | 10/1977 | Chaplin et al. | ............ | 415/116 |
| 4,242,042 A * | 12/1980 | Schwarz | ............ | 415/116 |
| 4,285,633 A * | 8/1981 | Jones | ............ | 415/191 |
| 4,314,792 A * | 2/1982 | Chaplin | ............ | 415/116 |
| 4,537,024 A * | 8/1985 | Grosjean | ............ | 415/139 |
| 4,621,976 A * | 11/1986 | Marshall et al. | ............ | 415/191 |
| 4,897,021 A * | 1/1990 | Chaplin et al. | ............ | 415/173.7 |
| 5,215,432 A | 6/1993 | Pickering et al. | ............ | 415/119 |
| 5,346,362 A * | 9/1994 | Bonner et al. | ............ | 415/119 |
| 5,354,072 A * | 10/1994 | Nicholson | ............ | 277/647 |
| 5,429,479 A * | 7/1995 | Cordier | ............ | 415/209.3 |
| 5,462,403 A * | 10/1995 | Pannone | ............ | 415/173.1 |
| 5,681,142 A | 10/1997 | Lewis | ............ | 415/119 |
| 5,827,047 A * | 10/1998 | Gonsor et al. | ............ | 416/193 A |
| 5,927,942 A * | 7/1999 | Stahl et al. | ............ | 415/115 |
| 6,139,264 A * | 10/2000 | Schilling | ............ | 415/174.2 |
| 6,267,557 B1 * | 7/2001 | Chin | ............ | 416/190 |
| 6,682,300 B2 * | 1/2004 | Bolms | ............ | 415/173.3 |

* cited by examiner

*Primary Examiner*—Darren Schuberg
*Assistant Examiner*—Yahveh Comas
(74) *Attorney, Agent, or Firm*—Bachman & LaPointe (57) ABSTRACT

A damper for a stator assembly, the stator assembly comprising a stator segment and a seal mounted to the stator segment. The damper locates between the stator segment and the seal, and comprises: a medial section; and opposed arms extending from the medial section. The medial section engages one of the stator segment and the seal and the opposed arms engage the other of the stator segment and the seal. A method of making the damper, comprising the steps of: providing a sheet of material having a medial section and opposed arms extending from the medial section; forming a bend at the medial section so that the medial section can engage one of the stator segment and the seal; and forming a bend at each of the arms so that the arms can engage the other of the stator segment and the seal.

16 Claims, 9 Drawing Sheets

DAMPER FOR STATOR ASSEMBLY

STATEMENT OF GOVERNMENT RIGHTS

The U.S. Government may have rights in this invention pursuant to Contract Number N00010-02-C-3003 with the United States Navy.

BACKGROUND OF INVENTION

This invention relates to a damper for a stator vane of a gas turbine engine. Specifically, this invention relates to a damper for reducing vibration between a vane assembly and a seal secured to the vane assembly.

Gas turbine engines include alternating stages of rotating blades and stationary vanes. Each vane stage comprises a plurality of stator segments. A segment could include a plurality of vanes extending between an outer platform and an inner platform. Stator segments are commonly formed by casting or by brazing.

To relieve any build-up of stress caused by temperature gradients in the vanes and platforms during engine operation, the inner platform typically includes relief slits between adjacent vanes. These relief slits also help isolate vanes from vibration modes of adjacent vanes. The stator segment also includes a damper to reduce vibration amplitudes, thereby helping prevent vane cracking, The damper is typically formed into a spring by passing sheet metal through punch-press dies or forming rolls.

Conventional damper designs, however, have numerous drawbacks. First, conventional damper shapes can have asymmetric shapes that can apply unequalized damping forces to the mating surfaces on the stator assembly. Unequalized damping forces reduces the effectiveness of the damper. Second, conventional damper shapes require multiple passes through the punch-press dies or forming rolls. Multiple passes through the forming machines increases manufacturing costs. Third, the shape of conventional dampers (i.e. almost tubular) requires more material than is necessary for damping purposes. This additional material increases the weight of the engine.

SUMMARY OF INVENTION

It is an object of the present invention to provide an improved damper.

It is a further object of the present invention to provide a damper that balances damping forces on the mating surfaces of the stator assembly.

It is a further object of the present invention to provide a less complex damper.

It is a further object of the present invention to provide a damper that can be formed in a single pass through the forming equipment.

It is a further object of the present invention to provide a damper that can be formed in a single pass through the forming dies/rolls.

It is a further object of the present invention to produce a damper at reduced manufacturing costs.

These and other objects of the present invention are achieved in one aspect by a stator assembly, comprising: a stator segment; a seal mounted to said stator segment; and a damper between the stator segment and the seal. The damper has: a medial section; and opposed arms extending from the medial section. The medial section engages one of the stator segment and the seal and the opposed arms engage the other of the stator segment and the seal.

These and other objects of the present invention are achieved in another aspect by a damper for reducing vibration between a stator segment and a seal, comprising: a medial section for engaging one of the stator segment and the seal; and opposed arms extending from the medial section for engaging the other of the stator segment and the seal.

These and other objects of the present invention are achieved in another aspect by a method of making a damper for reducing vibration between a stator segment and a seal, comprising the steps of: providing a sheet of material having a medial section and opposed arms extending from the medial section; forming a bend at the medial section so that the medial section can engage one of the stator segment and the seal; and forming a bend at each of said arms so that the arms can engage the other of the stator segment and the seal.

BRIEF DESCRIPTION OF DRAWINGS

Other uses and advantages of the present invention will become apparent to those skilled in the art upon reference to the specification and the drawings, in which.

DETAILED DESCRIPTION

Figure 1:
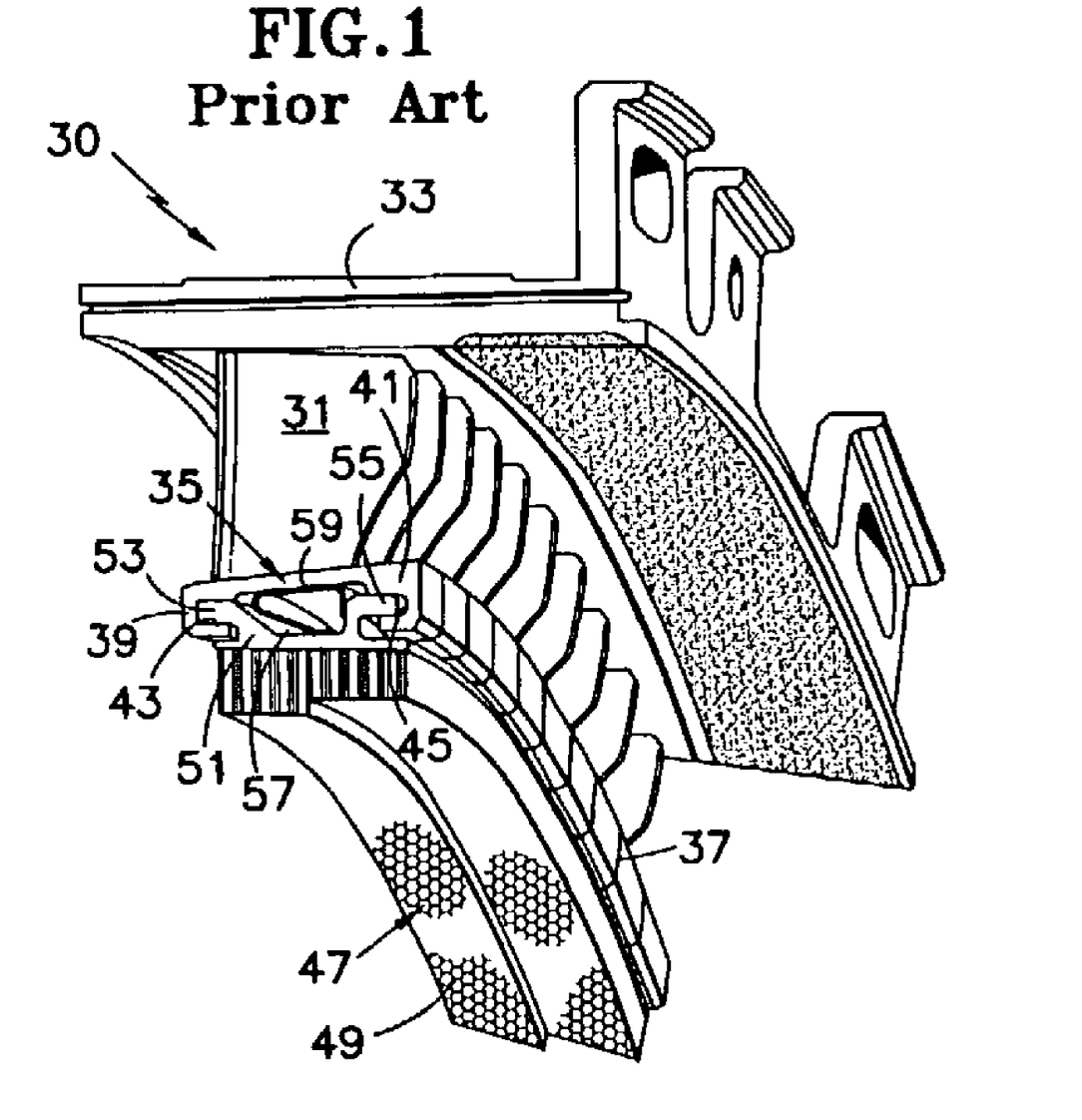
FIG. 1 is a perspective view of a conventional stator assembly.
Figure 2:
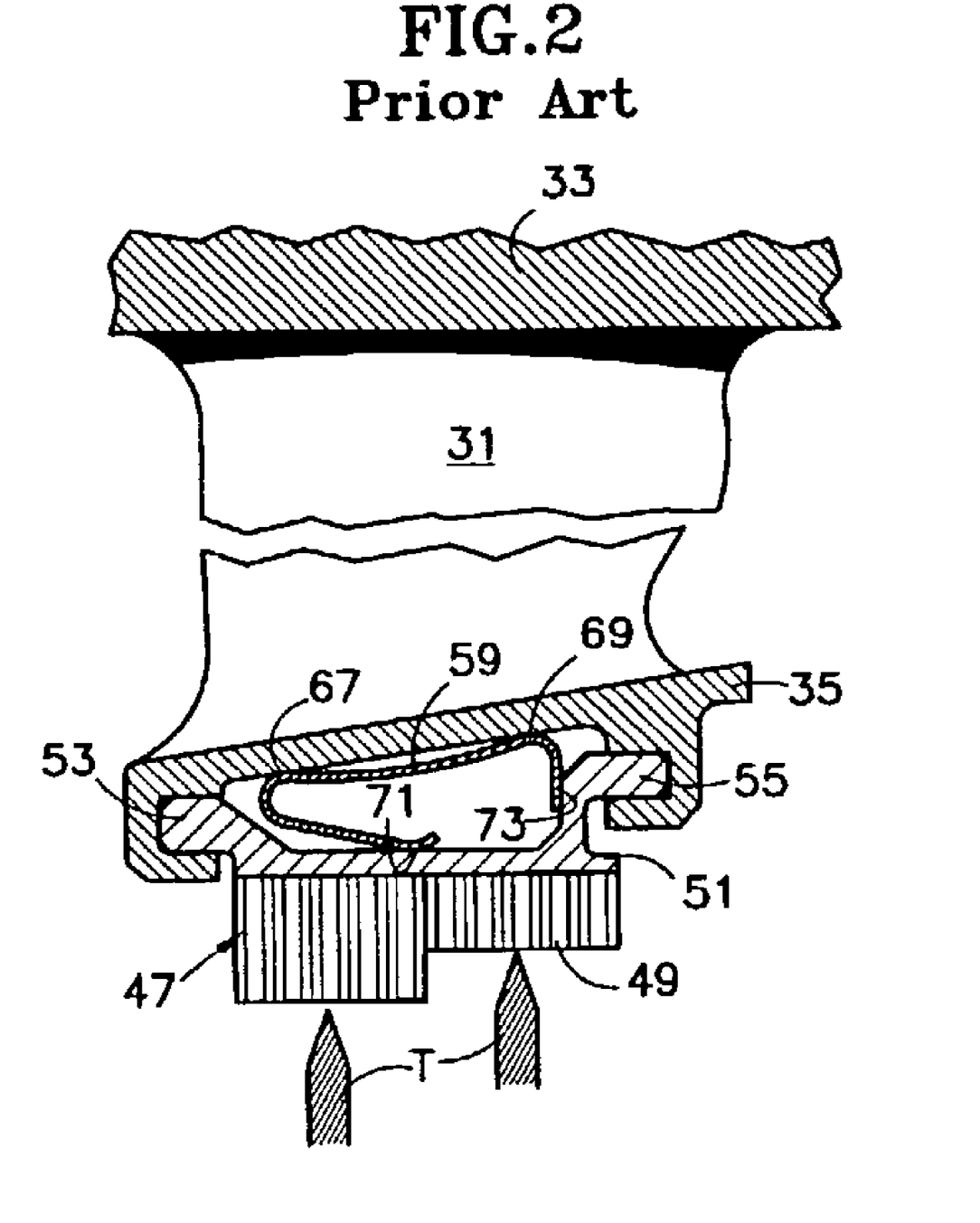
FIG. 2 is a cross-sectional view of a section of a gas turbine engine using the stator assembly of FIG. 1.

FIGS. 1 and 2 display a conventional stator assembly 30 used in the compressor section of a gas turbine engine. The assembly 30 is a vane segment having a plurality of vanes 31 extending between a radially outer platform 33 and a radially inner platform 35. The assembly 30 is typically made by a casting or a brazement. A plurality of relief slits 37 in the inner platform 35 help reduce the build-up of stress caused by temperature gradients in the vanes 31 and platforms 33, 35 during engine operation.

The inner platform 35 includes an upstream flange 39 and a downstream flange 41. The flanges 39, 41 respectively include channels 43, 45 that accept an inner air seal 47. The inner air seal 47 comprises the seal land of a labyrinth seal assembly. Labyrinth seals prevent fluid leakage between a stationary component (e.g. stator assembly 30) and a rotating component (e.g. the compressor rotor).

The seal land 47 includes an abradable material 49 (such as a metal honeycomb) mounted to a support plate 51. Seal teeth T extend from the compressor rotor (not shown), face the abradable material and define a clearance therebetween. The clearance determines the effectiveness of the labyrinth seal.

The support plate 51 includes opposed feet 53, 55 that correspond to the channels 43, 45 in the inner platform 35.

When mounted together, the inner platform 35 and the inner air seal 47 define a cavity 57. An arcuate damper 59 resides in the cavity 57. An example of this damper 59 is part number 4319363 available from Pratt & Whitney of East Hartford, Conn.

Figure 3:
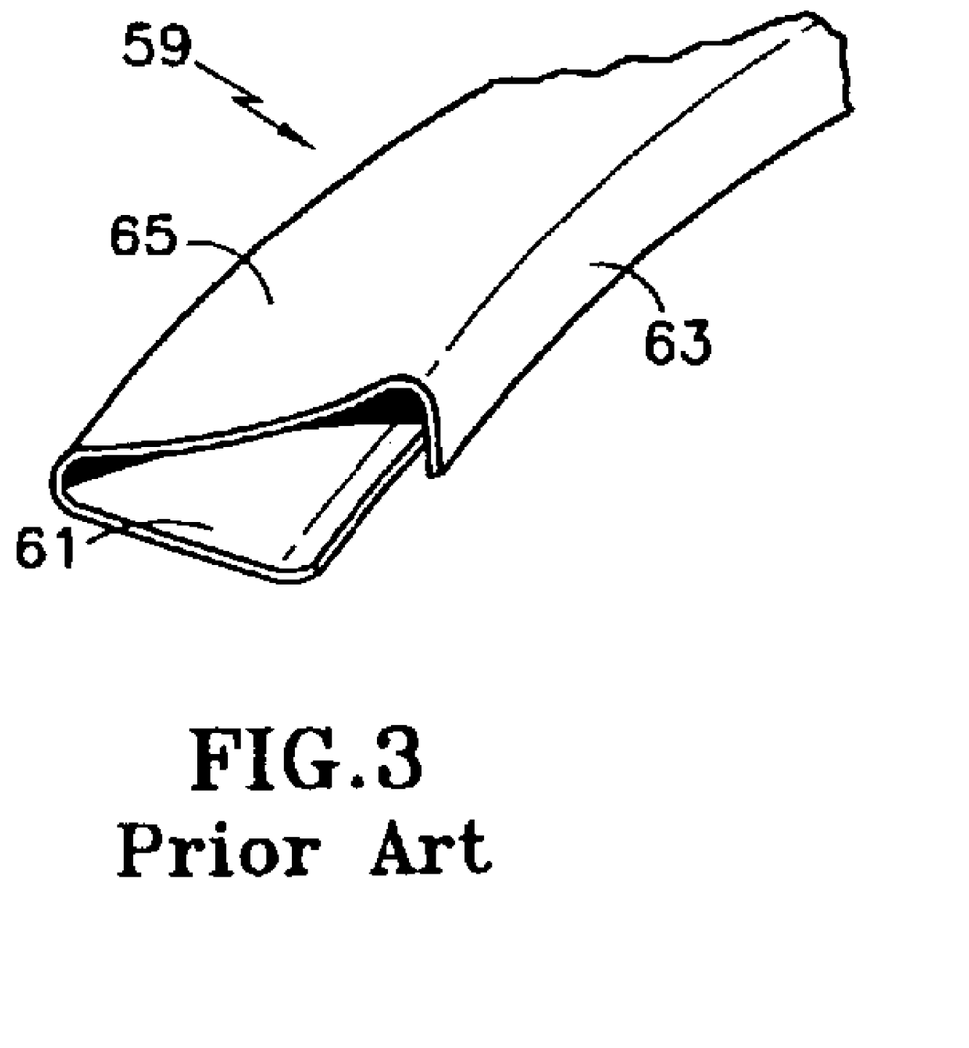
FIG. 3 is a perspective view of a damper from the stator assembly of FIG. 1.

FIG. 3 is a detailed view of the damper 59. The damper 59 includes opposed arms 61, 63 extending from a central section 65. The damper 59 is formed from a sheet (not shown) of metal. At a first step, a forming die (not shown) folds the arms 61, 63 away from the central section 65. At a second subsequent step, another forming die (not shown) bends the damper into an arcuate shape.

The damper 59 requires compression for placement within the cavity 57. After insertion, this compression allows the damper 59 to provide the appropriate amount of loading to the inner platform 35 and the inner air seal 47 for reducing vibration. As seen in FIG. 2, the damper 59 contacts the inner platform 35 at two locations 67, 69. Similarly, the damper 59 contacts the inner air seal 47 at two locations 71, 73.

One drawback of this stator assembly 30 is the inability of the damper 59 to apply equal loading applied to the inner platform 35 at locations 67, 69. Due to the shape of the flowpath for core flow through the engine, the cavity 57 has a wedge shape. As seen in FIG. 2, the cavity 57 enlarges in the downstream direction. This cavity shape requires the damper 59 to have an asymmetric shape. The asymmetric shape of the damper 59 produces unequal forces between the damper 59 and the corresponding mating surfaces of the inner platform 35. Such unequal loading reduces the effectiveness of the damper 59. For example, the unequal loading of the damper 59 produces a torsional deformation in the vane when the vane vibrates in the flexing mode (relative to the engine circumferential direction). Similarly, the unequal loading of the damper 59 produces a flexural deformation in the vane when the vane vibrates in a torsional mode. These deformations increase vane stresses.

Another drawback is the forming process that produces the damper 59. When forming an asymmetric shape, the sheet metal tends to deform out of plane. The tooling used to form the damper 59 must compensate for this tendency. This complicates tooling design and increases manufacturing costs. Additional manufacturing costs occasionally occur should the damper 59 require straightening to correct such deformations.

Another drawback is the complex design of these dampers. Manufacturing tolerances prevent the manufacture of every damper to match the exact dimensions of every stator platform. To compensate for this possible mismatch and to allow the damper to comply evenly with the surfaces of the stator, the damper must have low stiffness in the circumferential direction. This helps reduce vibrational stresses equally over all vanes of the segment. Asymmetric dampers, however, introduce one additional level of complexity to this problem. Specifically, asymmetric dampers 57 exhibit different bending stiffness (in the circumferential direction) at the fore and aft contact points 67, 69.

Figure 4:
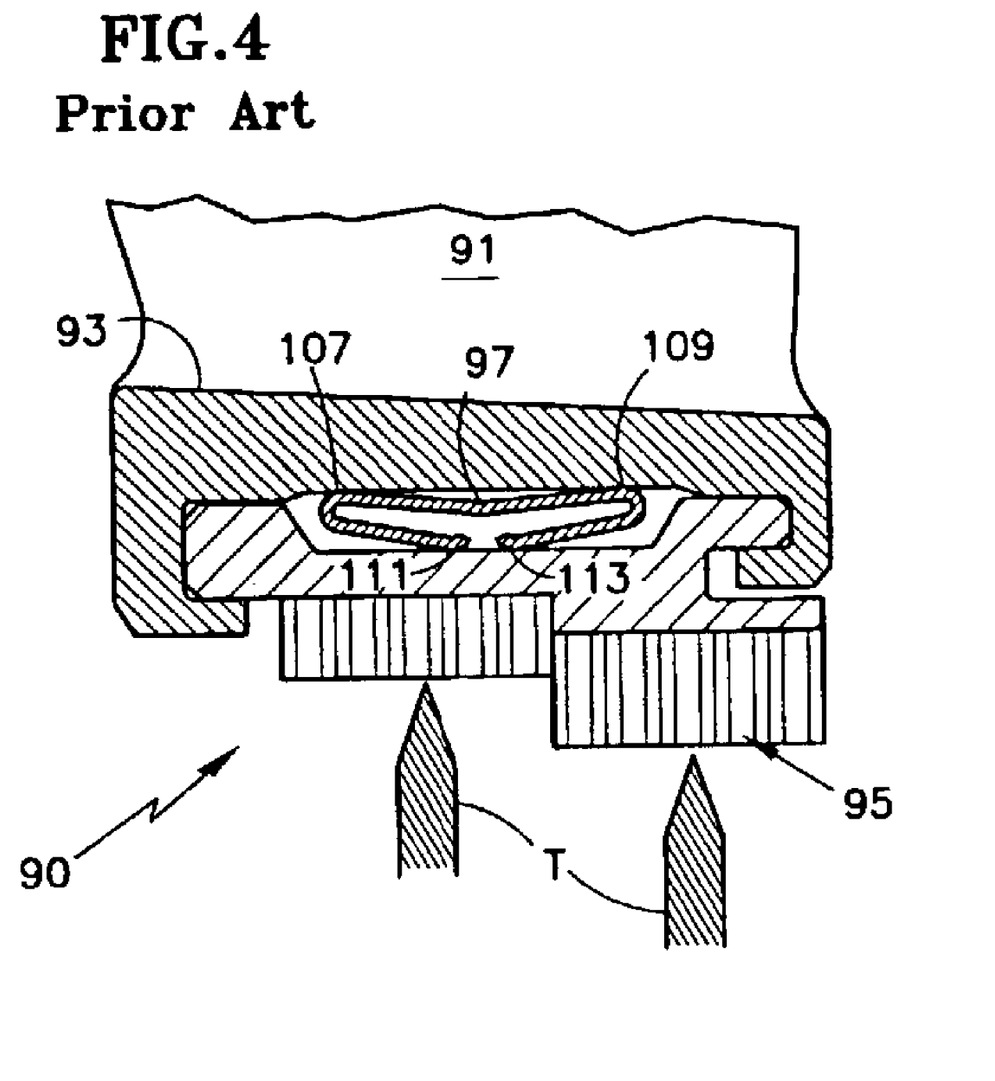
FIG. 4 is a cross-sectional view of a section of a gas turbine engine using another conventional stator assembly.
Figure 5:
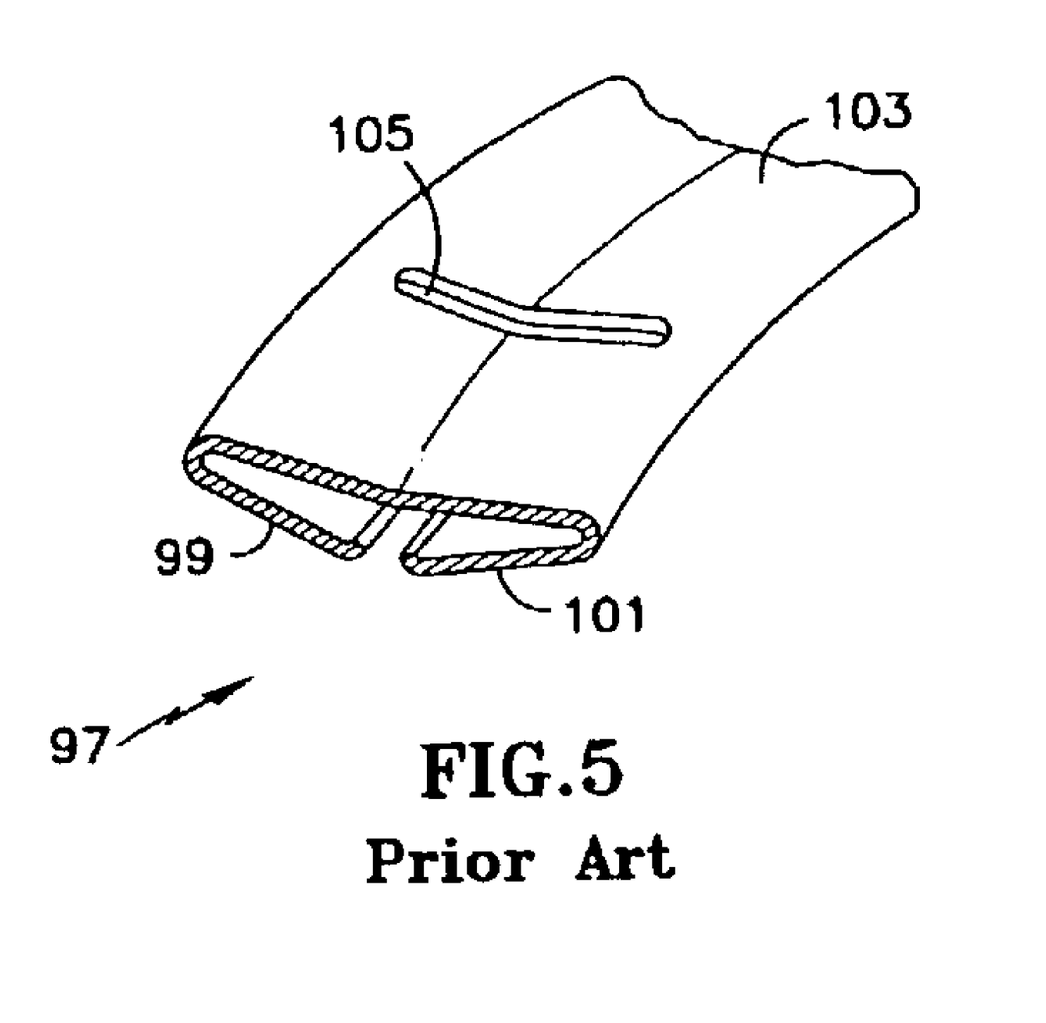
FIG. 5 is a perspective view of a damper from the stator assembly of FIG. 4.

FIGS. 4 and 5 display another conventional stator assembly 90. Similar to the aforementioned assembly 30, the assembly 90 includes a plurality of vanes 91 extending between a radially outer platform (not shown) and a radially inner platform 93. The inner platform 93 accepts an inner air seal 95.

An arcuate damper 97 resides between the inner platform 93 and the inner air seal 95. An example of this damper 97 is part number 55H401 available from Pratt & Whitney of East Hartford, Conn.

FIG. 5 is a detailed view of the damper 97. The damper 97 includes opposed arms 99, 101 extending from a central section 103. The damper 97 is formed from a sheet of metal (not shown). At a first step, a forming die (not shown) folds the arms 99, 101 over the central section 103. At a second subsequent step, another forming die (not shown) bends the damper into an arcuate shape. Slots 105 help reduce the bending stiffness of the damper 97, which permits more even distribution of load into each of the individual vane platforms 35.

The damper 97 requires compression for placement between the inner platform 93 and the inner air seal 95. After insertion, this compression allows the damper 97 to provide the appropriate amount of loading to the inner platform 93 and inner air seal 95 for reducing vibration. As seen in FIG. 4, the damper 97 contacts the inner platform 93 at two locations 107, 109. The damper 97 also contacts the inner air seal 95 at two locations 111, 113.

Similar to the damper 57, the damper 97 has several drawbacks. First, forming the damper 97 requires multiple passes through the tooling equipment.

Second, the damper 97 can function only in symmetric cavities. With symmetric cavities, dampers can provide equal damper loading to the contact points 107, 109. In order to use the damper 97, the designer would have to modify the asymmetric cavity with additional structure to create a symmetric cavity. This, however, introduces unnecessary weight and cost to the engine.

Figure 6:
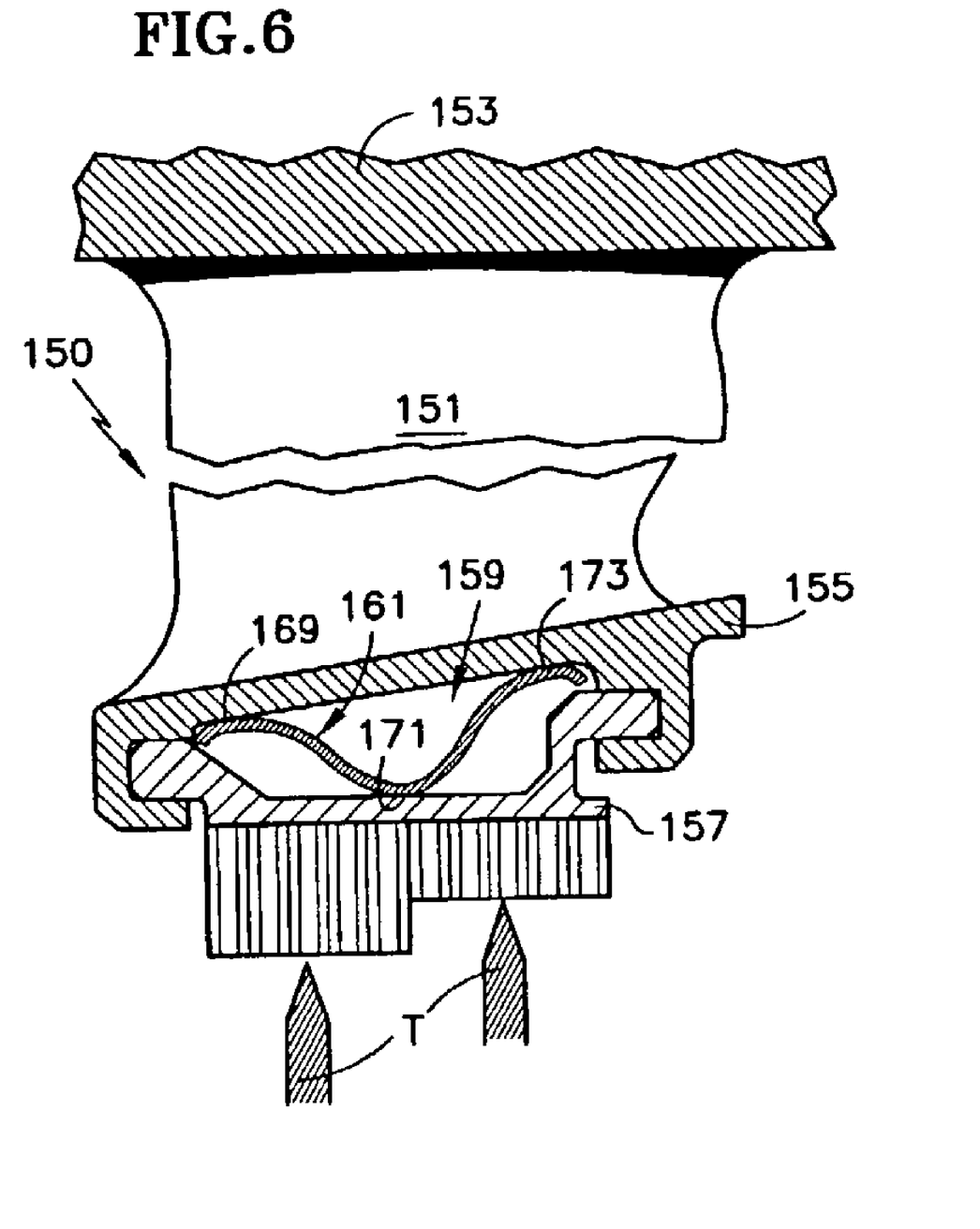
FIG. 6 is a cross-sectional view of a stator assembly in a gas turbine engine with one alternative embodiment of a damper of the present invention.
Figure 7:
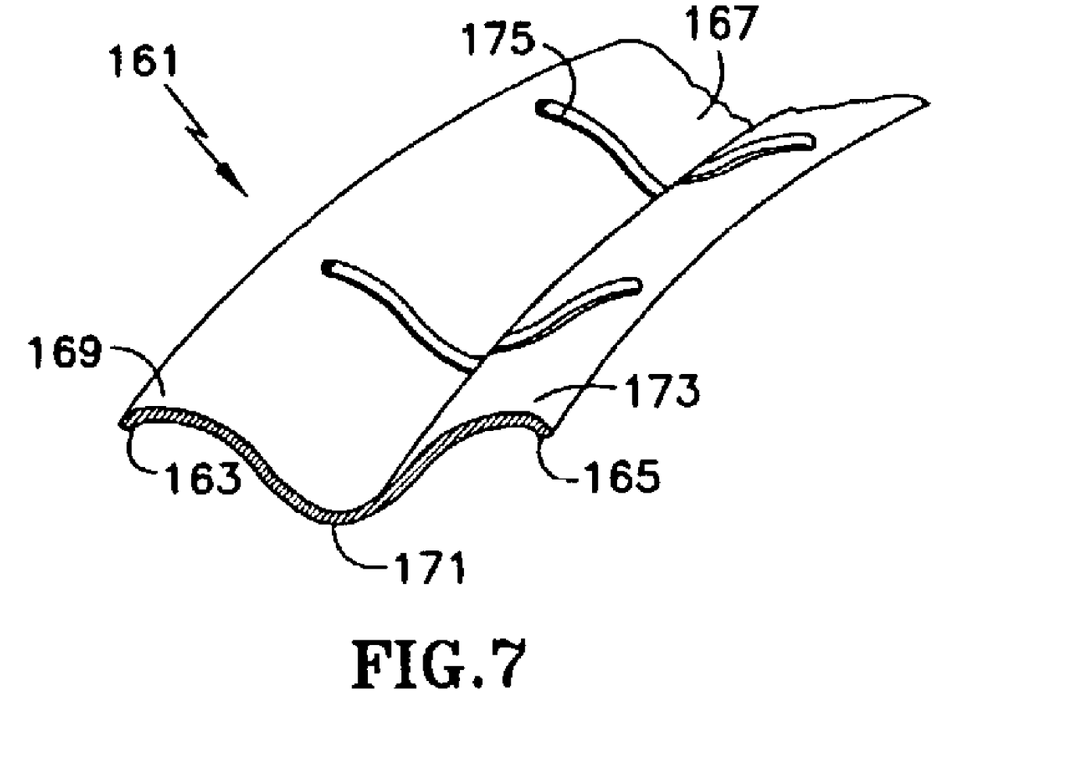
FIG. 7 is a perspective view of the damper of FIG. 6.

FIGS. 6 and 7 display one alternative embodiment of a stator assembly 150 of the present invention. The following description omits features of the stator assembly 150 previous described with respect to assemblies 30, 90 that are unnecessary for an understanding of the present invention. The stator assembly 150 of the present invention includes a plurality of vanes 151 extending between a radially outer platform 153 and a radially inner platform 155. The assembly 150 is typically made by casting.

The inner platform 155 accepts an inner air seal 157. The inner air seal 157 comprises the seal land portion of a labyrinth seal assembly. The other portion of the labyrinth seal comprises seal teeth T on a rotating component (e.g. the compressor rotor). The labyrinth seal prevents fluid leakage between the stator assembly 150 and the rotor. The clearance between the teeth T and the inner air seal 157 determines the effectiveness of the labyrinth seal.

When mounted together, the inner platform 155 and the inner air seal 157 define a cavity 159. Due to the shape of the flowpath for core flow through the engine, the cavity 159 has a wedge shape. As seen in FIG. 6, the cavity 159 enlarges in the downstream direction. An arcuate damper 161 resides in the cavity 159. FIG. 7 provides a detailed view of the damper 161.

The damper 161 includes opposed arms 163, 165 extending from a medial or central section 167. Differently than with the aforementioned dampers 59, 97, the damper 161 of the present invention can be formed in one pass through forming rolls (not shown) or a punch-press (not shown). The less complex shape of the damper 161 (compared to dampers 59, 97) allows formation in one pass. In other words, the single pass through the forming rolls/punch press creates bends 169, 171, 173 and creates the arcuate curve in the damper 161. The forming rolls/punch press can also create slots 175 when forming the bends 169, 171, 173 and arcuate curve. Alternatively, the slots 175 could be provided to the sheet metal before passing through the forming rolls/punch press.

As with the earlier conventional dampers 59, 97, the damper 161 requires compression for placement within the cavity 159 and to create the required load for vibration damping. Referring back to FIG. 6, the damper 161 contacts the inner platform 155 and the inner air seal 157 at three locations. These contact locations correspond to the bends 169, 171, 173. Specifically, the damper 161 contacts the platform 155 at two points, the bends 169, 173 on the arms 163, 165, and the seal 157 at one point, the bend 171 on the central section 167.

Differently than with the earlier dampers 59, 97, the damper 161 can better compensate for unequal loading applied to the inner platform 155 at bends 169, 173. Should unequal loading exist on the arms 163, 165, the damper 161 will, in response, roll along the mating surface of the inner air seal 157 at bend 171 of the central section 167. The damper 161 will stop rolling along the bend 171 when the loading applied to the inner platform at bends 169, 173 equalizes.

As seen in FIG. 7, the damper 161 has an asymmetric shape to accommodate the tapered shape of the cavity 159. The asymmetric design is more amenable to the adjustment of geometric attributes of the damper 161 to produce the desired loads against the platform 155. This configuration also more readily accommodates variation in the cavity between the platform 155 and the seal 157 created during manufacture or by wear during engine operation.

Figure 8:
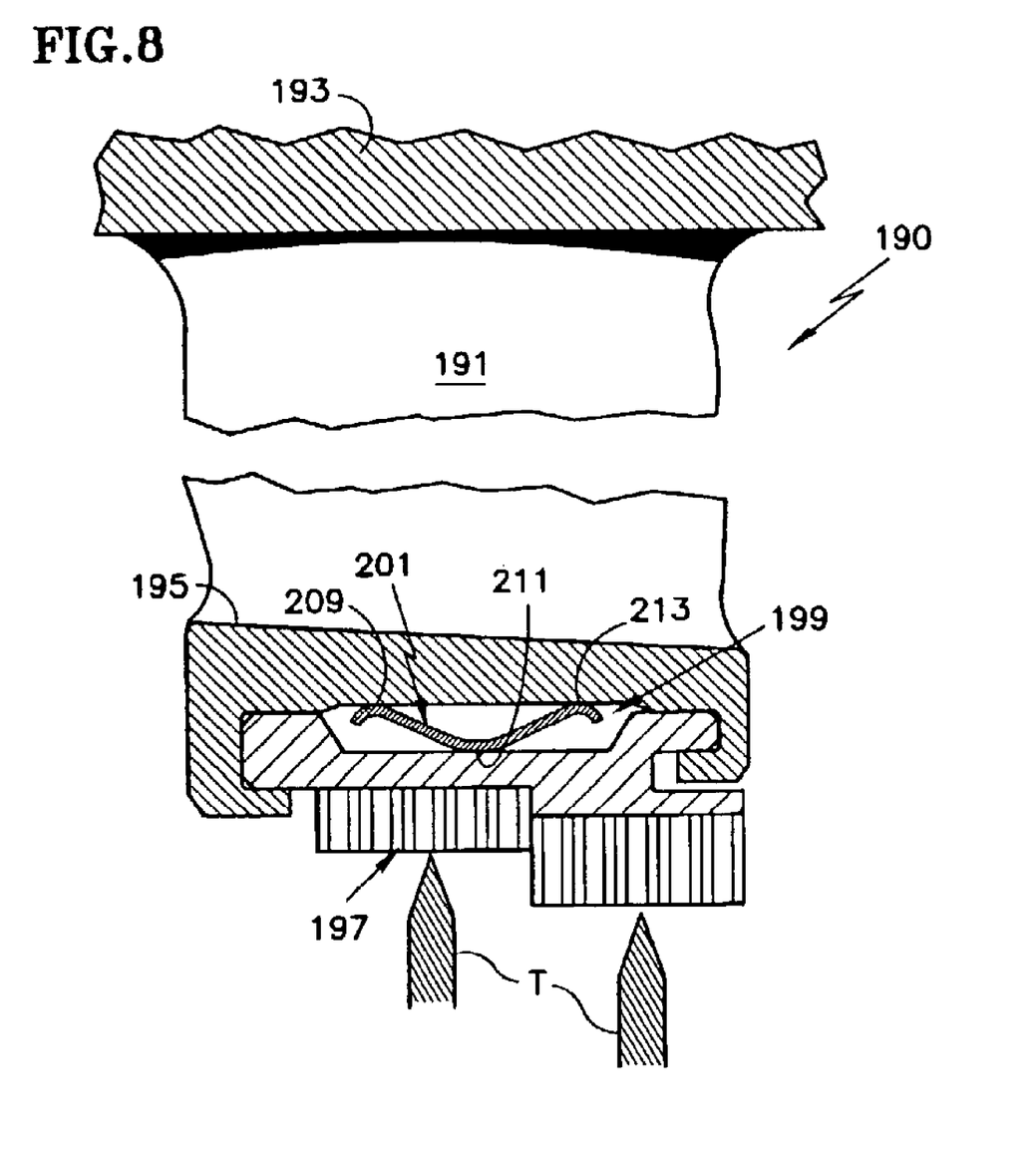
FIG. 8 is a cross-sectional view of a stator assembly in a gas turbine engine with another embodiment of a damper of the present invention.
Figure 9:
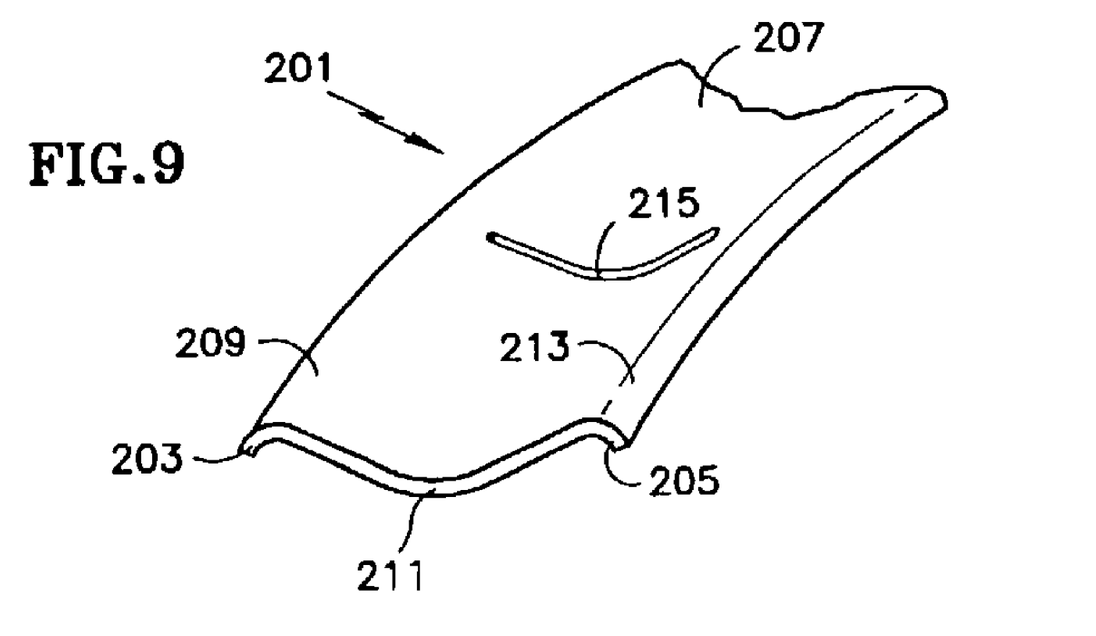
FIG. 9 is a perspective view of the damper of FIG. 8.

FIGS. 8 and 9 display another alternative embodiment of the present invention, a stator assembly 190. The stator assembly 190 of the present invention includes a plurality of vanes 191 extending between a radially outer platform 193 and a radially inner platform 195. The assembly 190 is typically made by casting.

The inner platform 195 accepts an inner air seal 197. The inner air seal 197 faces seal teeth T on a rotating component (e.g. the compressor rotor) to define a labyrinth seal. The clearance between the teeth T and the inner air seal 197 determines the effectiveness of the labyrinth seal. When mounted together, the inner platform 195 and in inner air seal 197 define a cavity 199. As seen in FIG. 8, the cavity 199 has a uniform size. An arcuate damper 201 resides in the cavity 199. FIG. 9 provides a detailed view of the damper 201.

The damper 201 has a different shape than damper 161 in order to function properly in cavity 199. Comparing FIGS. 6 and 8, damper 201 is shallower (in the radial direction) than damper 161. Damper 201 is shallower since the cavity 199 is shallower than cavity 159. Since the cavity has a uniform size (i.e. no taper in the downstream direction), the damper 201 is symmetric.

The damper 201 includes opposed arms 203, 205 extending from a central section 207. The damper 201 is formed from a sheet of metal (not shown) in the same manner as described above with damper 161. The forming process creates bends 209, 211, 213 and creates the arcuate curve in the damper 201. The forming process can also create slots 215 when forming the bends 169, 171, 173 and arcuate curve. Alternatively, the slots 215 could be provided to the sheet metal before passing through the forming rolls/punch press. The damper 201 also requires compression for placement within the cavity 199 and to create the required load for vibration damping. Referring back to FIG. 8, the damper 201 contacts the inner platform 195 and the inner air seal 197 at three locations. These contact locations correspond to the bends 209, 211, 213. Specifically, the damper 201 contacts the platform 195 at two points, the bends 209, 213 on the arms 203, 205, and the seal 197 at one point, the bend 211 on the central section 207.

Differently than the aforementioned conventional dampers 59, 97, the damper 201 can better compensate for unequal loading applied to the inner platform 195 at bends 209, 213. Should unequal loading exist on the arms 203, 205, the damper 201 will, in response, roll along the mating surface of the inner air seal 197 at bend 211 of the central section 207. The damper 201 will stop rolling along the bend 211 when the loading applied to the inner platform at bends 209, 213 equalizes.

As described above, the dampers of the present invention contact the inner platform of the stator at two locations and the seal at one location. The widely, and equally, spaced (about the vane axis) contact points provide sufficient contact force to resist torsion of the vane. If, however, damping vane torsional vibrations is not the prime concern, the dampers could be designed in an opposite arrangement (not shown) so that the damper contacts the inner platform of the stator at one location and the seal at two locations. Such an arrangement is useful, for example, in instances where stress caused by inner air seal vibration may be the prime concern.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

The invention claimed is:

1. A stator assembly, comprising:
    a stator segment;
    a seal mounted to said stator segment; and
    said stator segment and said seal defining a cavity which enlarges in a downstream direction;
    a damper between said stator segment and said seal, said damper being positioned within said cavity and consisting of a medial section having only a single bend and opposed arms extending from said medial section;
    each of said opposed arms having a single bend;
    wherein said medial section contacts one of said stator segment and said seal, said opposed arms contact the other of said stator and said seal, and said damper can roll along one of said stator segment and said seal at said bend in response to an unequal loading.

2. The stator assembly of claim 1, wherein said damper is asymmetric.

3. The stator assembly of claim 1, wherein said medial section contacts said seal.

4. The stator assembly of claim 1, wherein said damper further comprises a plurality of slots.

5. A damper for reducing vibration between a stator segment and a seal, comprising:
    a medial section for engaging one of said stator segment and said seal;
    opposed arms attached to and extending from said medial section for engaging the other of said stator segment and said seal, each of said arms having a single bend; and
    said medial section having only a single bend,
    wherein said damper is asymmetric and can roll along one of said stator segment and said seal at said bend in said medial section in response to an unequal loading.

6. The damper of claim 5, wherein said medial section engages said seal.

7. The damper of claim 5, wherein said damper further comprises a plurality of slots.

8. The stator assembly of claim 1, wherein said arms are not folded over said medial section.

9. The damper of claim 5, wherein said arms are not folded over said medial section.

10. A stator assembly, comprising:
   a stator segment comprising a platform;
   a seal mounted to said stator segment;
   said platform having a first portion which fits into a slot in said seal and a C-shaped section for receiving an end portion of said seal;
   said platform and said seal defining a uniform size cavity; and
   a damper positioned within said uniform size cavity, said damper contacting said seal and said platform at only three locations and having:
   a medial section; and
   opposed arms extending from said medial section;
   wherein said arms are not folded over said medial section; and
   wherein said medial section contacts one of said platform and said seal at one of said locations and said arms contact the other of said platform and said seal at two of said locations.

11. The stator assembly of claim 10, wherein said damper is symmetric.

12. The stator assembly of claim 10, wherein said damper further comprises a plurality of slots.

13. The stator assembly of claim 10, wherein said medial section contacts said seal.

14. The stator assembly of claim 10, further comprising a bend in said medial section.

15. The stator assembly of claim 14, further comprising bends between said medial section and said arms, wherein said bend in said medial section and said bends between said medial section and said arms are formed simultaneously.

16. The stator assembly of claim 1, wherein said stator segment includes an inner platform and said seal comprises an inner air seal and wherein said inner platform and said inner air seal define said cavity.

* * * * *